United States Patent [19]
Robinson et al.

[11] Patent Number: 6,005,997
[45] Date of Patent: Dec. 21, 1999

[54] LONG-HAUL TERRESTRIAL OPTICAL FIBER LINK HAVING LOW-POWER OPTICAL LINE AMPLIFIERS WITH INTEGRATED DISPERSION COMPENSATION MODULES

[75] Inventors: Andrew N. Robinson, Plano; Scott A. Welch, Allen, both of Tex.

[73] Assignee: MCI Communications Corporation, Washington, D.C.

[21] Appl. No.: 09/001,829

[22] Filed: Dec. 31, 1997

[51] Int. Cl.$^6$ ............................. G02B 6/02; H04B 10/00
[52] U.S. Cl. ........................ 385/24; 359/115; 359/174; 359/341
[58] Field of Search ..................... 385/24, 123; 359/160, 359/161, 115, 341, 174, 179, 173

[56] References Cited

U.S. PATENT DOCUMENTS

| | | | |
|---|---|---|---|
| 5,035,481 | 7/1991 | Mollenauer | 359/124 |
| 5,365,362 | 11/1994 | Gnauck et al. | 359/174 |
| 5,532,868 | 7/1996 | Gnauck et al. | 359/332 |
| 5,559,920 | 9/1996 | Chraplyvy et al. | 385/123 |

*Primary Examiner*—Akm E. Ullah

[57] ABSTRACT

The present invention provides an improved terrestrial optical fiber communications network link including an increased number of amplification sites spaced at intervals along the link in series with shorter optical fiber spans. One embodiment of the invention includes an improved long-haul terrestrial optical fiber link having low-power line optical amplifiers (LPLAs) at the amplification sites connected together by optical fiber spans. In other embodiments of the present invention, some or all of the LPLAs have integrated dispersion compensation modules (DCMs). Another embodiment of the improved optical fiber link system uses proper adjustment and spacing of LPLA amplifiers (e.g., spaced between 30–60 km long fiber spans) to eliminate the need for lightwave regenerators (LREs) even along very long (e.g., 300–2500 km long or even longer) links. The long-haul optical link is transparent to wavelength or combination of wavelengths in the erbium band, and any combination of modulations applied to those wavelengths. The long-haul terrestrial optical fiber link of the present invention has several differences from the traditional optical fiber links. Low-power line amplifiers (LPLAs) of the present invention differ in several ways from bi-directional line amplifiers (BDLAs). The low-power line amplifiers of the present invention also differ from submarine amplifiers.

11 Claims, 3 Drawing Sheets

LONG-HAUL TERRESTRIAL OPTICAL FIBER LINK HAVING LOW-POWER OPTICAL LINE AMPLIFIERS WITH INTEGRATED DISPERSION COMPENSATION MODULES

BACKGROUND OF THE INVENTION

1. Field of the Invention

The present invention relates to communications networks. More particularly, the invention relates to an improved design for an optical fiber communications network link using low-power optical line amplifiers which obviates the need for regenerators.

2. Related Art

A typical communications network, serving to transport information between a number of locations, includes various physical sites, called nodes, interconnected by information conduits, called "links." Each telecommunications link serves to carry information from one site to another. Individual sites contain equipment for combining, separating, transforming, conditioning, and/or routing data.

Such telecommunications links are generally implemented using electrical cables, satellites, radio or microwave signals, or optical connections. Telecommunications links can stretch for tens or hundreds of miles between sites. Through these links, a telecommunications system can carry voice and data signals between and among nodes to effectively interconnect data remote equipments, e.g., computers, remote terminals, servers, etc.

Optical fiber telecommunications networks include a plurality of optical fiber transmission lines, also known as "optical fiber links". Such optical fiber links facilitate high bandwidth communications and can be used in voice and data network systems. High speed data can be modulated on light waves which are transmitted through the optical network. The optical transmission line, connecting an optical transmitter and receiver, can propagate many light wave signals of different frequencies simultaneously. Thus, fiber optic communications links carry vast amounts of information among distant sites to facilitate data and voice connectivity over a large geographical area.

Through these optical fiber links information is transported from node to node in the form of an optical signal. Electrical data-carrying signals are manipulated within the nodes. The electrical data-carrying signals are usually not suitable to be directly propagated along the optical fiber links. Instead, a Line Terminal Equipment (LTE) at either end of the optical fiber link serves to convert the data-carrying signals between the optical and electrical domains and to amplify the data-carrying signals. By converting and amplifying the data-carrying signals, the signals can traverse a long link and can be faithfully rendered at a distant node. In this approach, an LTE at one node converts data-carrying electrical signals into near-infrared optical signals that are then coupled into a long, slender optical fiber. At the other end of the optical fiber link, an optical receiver, as part of a remote LTE, detects the optical signals and recreates the corresponding data-carrying electrical signal.

Frequently, optical fiber links are so long that several intermediate amplification stages are required along the length of the fiber. Amplification can be accomplished by using optical line amplifiers. The most common optical amplifiers include Bi-directional Line Amplifiers (BDLAs) which incorporate high gain amplifiers, either erbium-doped fiber amplifiers (EDFAs), which amplify with a laser pump diode and a section of erbium-doped fiber, or semiconductor laser amplifiers.

Performance of the high-bandwidth optical fiber link can be impaired by several inherent properties of optical fiber. One property, fiber loss, reduces the average power reaching the receiver of the LTE over the optical fiber link. Fiber loss is the attenuation of the optical signal over the link. Optical receivers require a certain minimum amount of power in order for the LTE to accurately recover the signal and the information contained in the signal. The optical line amplifiers used in the intermediate amplification stages can increase the average power reaching the receiver, thus compensating for fiber loss. Thus, loss compensation can be carried out by optical amplifiers which amplify the optical bit stream directly without requiring conversion back into the electrical domain. Two peculiar aspects of optical line amplifiers are that stronger incoming signals receive more amplification than weak signals and that the frequency response is noticeably uneven across the popular erbium band. Thus, in a group of wavelengths traveling through the link, one wavelength may successively gain in strength enough to disadvantage other wavelengths.

In addition to using optical line amplifiers to compensate for fiber loss, very long optical links require one or more optical regenerators to be placed at intervals along the fiber link which convert the optical bit stream back into the electrical domain. A detailed description of fiber-optic communication systems is described in *Fiber-Optic Communication Systems*, by Govind P. Agrawal, page 186, the text of which is incorporated herein by reference, in its entirety. It is commonly thought that when the link length exceeds a certain value, in the range of 20–100 km depending on the operating wavelength, it becomes necessary to compensate for fiber loss using a regenerator, as the signal would otherwise become too weak to be detected reliably. A regenerator is a type of repeater or "re-modulator" which performs additional functions. A re-modulator includes a receiver (demodulator), a pulse recovery, retiming, and reshaping ("3R") device, and a retransmitter (modulator) connected in succession. When the regenerator receives a degraded optical signal, it first converts the signal into the electrical domain. Then the regenerator recovers the clock or electrical bit stream from the degraded optical signal, retimes and reshapes the signal pulses. The regenerator converts the signal back into an optical bit stream by modulating the transmitter. The regenerator finally retransmits the fresh representation of the signal along the optical fiber.

In addition to loss, the fiber medium can introduce other impairments to fiber optic performance, such as dispersion. Dispersion broadens optical pulses as they propagate in the fiber, because different spectral components of the pulse travel at slightly different group velocities. The group velocity associated with the fundamental mode is frequency dependent because of chromatic dispersion. This phenomenon is referred to as group-velocity dispersion (GVD), intramodal dispersion, or simply fiber dispersion. Fiber dispersion includes material dispersion and waveguide dispersion contributions. Waveguide dispersion is no longer a problem with the advent of single mode fibers.

Optical amplifiers have attracted considerable attention recently for overcoming fiber loss. Long-haul lightwave systems are now thought to be limited by fiber dispersion rather than by fiber loss. For such long-haul systems, optical amplifiers cannot be cascaded indefinitely, since dispersion-induced pulse distortion eventually limits the fiber optic system performance. A signal that goes through a link incorporating regenerators does not suffer from this dispersion problem are less likely to suffer from dispersion, because regenerators correct the pulse broadening effect by recovering the clock signal, retiming by reapplying the clock, and reshaping the signal. Thus for long point-to-point links, regenerators are thought to be the preferred means of loss compensation.

The spacing between repeaters, i.e. between two optical line amplifiers or an optical line amplifier and a regenerator, known as the transmission distance spacing, is traditionally an important design parameter, since system cost is thought to be reduced as the spacing between repeaters increases. However, transmission distance spacing depends on the bit rate because of fiber dispersion. The product of bit rate and the transmission distance spacing is generally used as a measure of system performance for point-to-point links. This product depends upon the operating wavelength, since both fiber loss and fiber dispersion depend upon wavelength. Thus, the traditional goal in designing a point-to-point link is to maximize the transmission distance spacing between repeaters so as to minimize overall system cost.

Modern optical fiber communications networks spanning long optical links are thought to require the use of regenerators. A regenerator is a relatively complex and expensive facility. Because a regenerator performs optical retransmission it must be equipped with receivers and transmitters of the correct wavelengths. Because of the electrical domain functions that are performed by a regenerator, a regenerator is also limited in the range of signal types that it can handle. This inflexibility under certain circumstances could present problems in the field. In performing network upgrades or circumventing failures, a given link may need to readily service a variety of carrier wavelengths and modulation formats. Presently, an extensive retrofit of a regenerator would be required to accommodate a change in link traffic. Modern communications networks are thought to be incapable of maintaining signal quality over long distances without the use of regenerators.

Wavelength division multiplexing (WDM) is a way of increasing the capacity of an optical fiber by simultaneously operating at more than one wavelength. WDM multiplexes signals by transmitting the signals at different wavelengths through the same fiber. WDM works similarly to frequency domain multiplexing (FDM). In optical communications, WDM is any technique by which two or more optical signals having different wavelengths are simultaneously transmitted in the same direction over one strand of fiber and then separated by wavelength at the distant end. Four wavelength wave division multiplexing (4WL-WDM or Quad-WDM) is a method of allowing a single fiber to accomodate four light signals instead of one, by routing them at different wavelengths through the use of narrow-band wave division multiplexing equipment. The technology allows transmission of four times the amount of traffic along an existing fiber. A backbone network's capacity which normally might operate at 2.5 Gbps over a single strand, would rise to 10 Gbps using Quad-WDM.

Thus, what is needed is an improved optical link for traversing exceptionally long distances that maintains signal quality, but also can handle a variety of carrier wavelengths and modulating schemes without requiring substantial facility changes.

SUMMARY OF THE INVENTION

The present invention comprises a long-haul optical fiber link including Line Terminal Equipment (LTE) sites terminating the ends of the link. The long-haul optical fiber link can span 300–2500 km or even greater in overall route length. Between the LTEs, a series of optical fiber spans are alternatingly coupled to amplification sites to make up the link. Each optical fiber span is approximately 30–60 km in length. Each amplification site contains a low-power optical line amplifier (LPLA). Each LPLA can include an integrated dispersion compensation module (DCM).

The present invention uses LPLAs to transmit an optical signal over the optical link, obviating the need for a lightwave regenerator (LRE). This obviation has several unexpected advantages including reductions in cost, complexity, and transparency of the link to the range of optical carriers and modulation schemes that it may transport. Several advantages of the invention include:

First, the present invention promotes wavelength and bit rate transparency throughout the network, making it possible to easily upgrade the transmission technology of the network by retrofitting only the terminal sites. Transparency also simplifies the task of deciding how to reroute traffic in the event of a failure elsewhere in the network. For example, a spare link implemented using the present invention may be called upon to handle any of a variety of optical signals present in the network that may need restoring.

Second, the invention extends the life span of the existing installed base of optical fiber hardware by requiring replacement of components only at the end points of the link.

Third, the invention, by using shorter fiber spans, spreads out amplification requiring lower power at the increased number of amplification sites. Using lower power yields a reduction or elimination of the nonlinear effects of the fiber. Thus, distributing amplification by using shorter spans of optical fiber yields the advantage that the entire link can run at a lower power level.

Fourth, the invention, by permitting DCMs to be placed at any amplification site and by using additional amplifier sites, enables more even distribution of dispersion compensation. This permits the use of smaller, less costly DCMs, which has the added advantage of decreasing fiber loss.

Fifth, the invention lowers output power and gain on each amplifier. This feature reduces and/or eliminates gain tilt, spontaneous emission noise, and other undesirable effects. By lowering output power and gain on each amplifier, laser pump power is also reduced, leading to extended amplifier lifetime and improved reliability.

Sixth, by eliminating regenerators, space at existing regenerator sites is cleared because optical amplifiers call for less floor space than do regenerators.

Seventh, the power levels required to support the link easily facilitate dense wavelength division multiplexing (WDM).

Eighth, the invention is wavelength scalable, which makes this approach more economical as wavelengths are added.

Ninth, by using shorter spans of the present invention, higher bit rate migration of 40 Gbps or even greater, such as 160 Gbps, is supported.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings.

Figure 1:
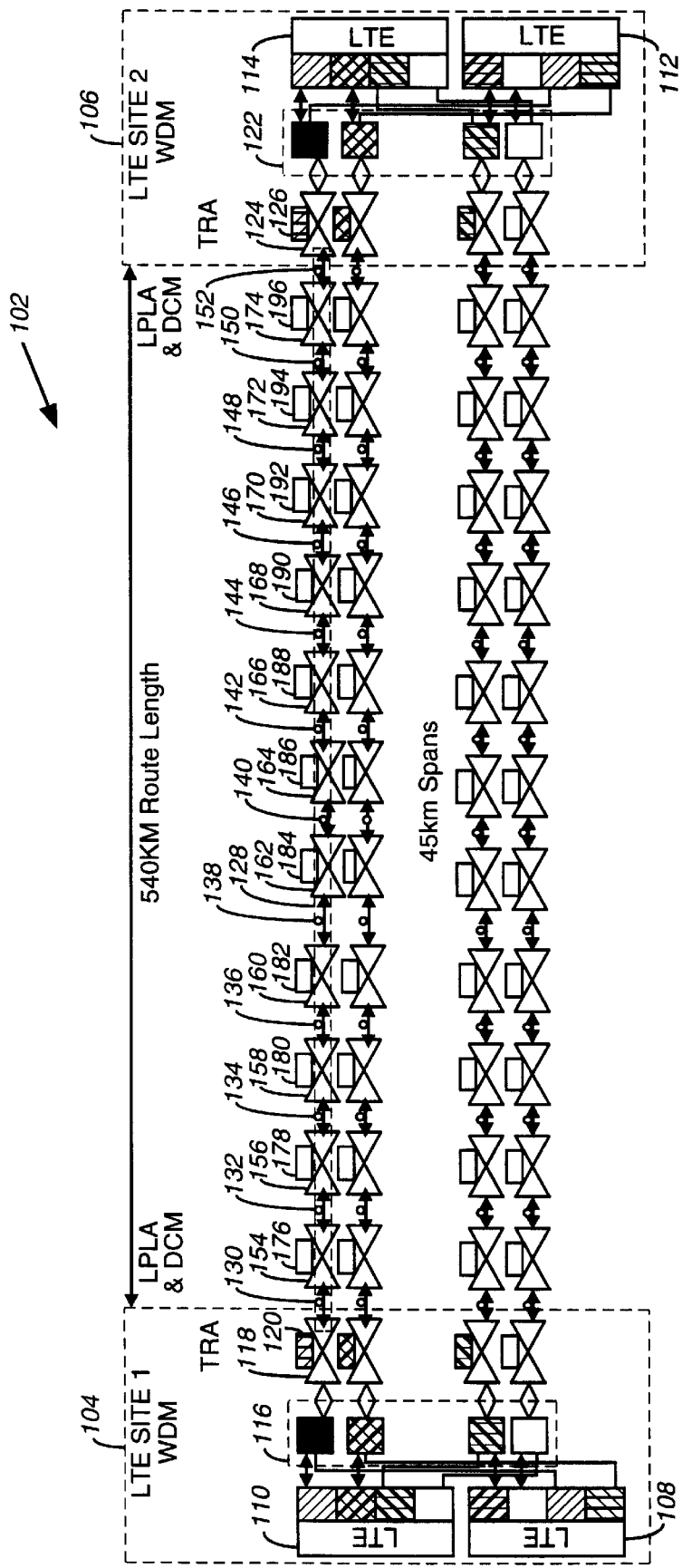
FIG. 1 is a block diagram depicting an optical link of the present invention including two LTE sites, several optical fiber spans and several low power optical line amplifiers (LPLAs)

The preferred embodiment of the invention is now described with reference to the figures. In the drawings, like reference numbers generally indicate identical, functionally similar, and/or structurally similar elements. Also in the figures, the left most digits of each reference number correspond to the figure in which the reference number is first used.

DETAILED DESCRIPTION OF THE INVENTION

The preferred embodiment of the invention is discussed in detail below. While specific implementations are discussed, it should be understood that this is done for illustration purposes only. A person skilled in the relevant art will recognize that other components, span lengths, link lengths and configurations may be used without parting from the spirit and scope of the invention.

Overview of the Invention

The present invention is directed to an improved optical fiber link for spanning long distances, in the range of 300–2500 km or even greater, using low power optical line amplifiers (LPLAs). The invention obviates the need for lightwave regenerators (LREs). The link comprises amplification sites, placed at frequent intervals alternating with 30–60 km optical fiber spans along an optical fiber communications network link. In a preferred embodiment of the invention, the optical fiber communications link is a terrestrial/landline link (as opposed to a transoceanic/submarine link).

FIG. 1 depicts an optical link designed according to the present invention. The present invention places a low-gain optical line amplifier, also commonly referred to as a low-power optical line amplifier (LPLA), at approximately 45 km intervals along an exemplary 540 km optical link. The present invention uses considerably more optical line amplifiers than the traditional optical link, but thereby obviates the need for a regenerator in the middle of the link to compensate for fiber loss and fiber dispersion. To minimize fiber dispersion, dispersion compensation modules (DCMs) are incorporated into each low-power optical line amplifier site as is further described with reference to FIG. 3 below. It is easier to use such a distributed compensation scheme than to allow the dispersion to accumulate through a long fiber. The optical link design approach of the present invention provides several unexpected advantages.

Figure 2:
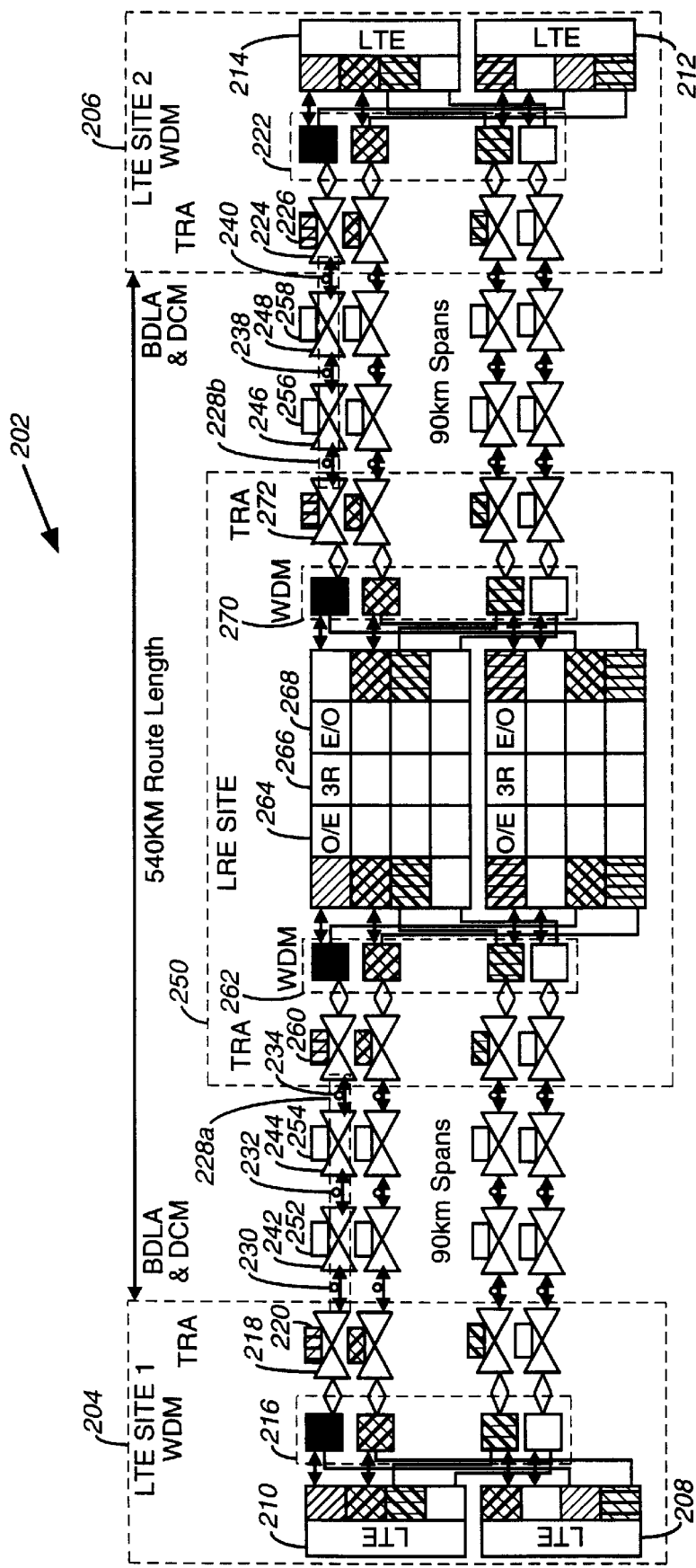
FIG. 2 is a block diagram depicting a traditional optical communications link used prior to the claimed invention including two LTE sites, several optical fiber spans, several bi-directional line amplifiers (BDLAs) and a LRE regenerator at its midpoint.

For comparison purposes, FIG. 2 depicts a traditional 540 km long optical fiber link which is usually implemented with bi-directional optical line amplifiers (BDLAs) placed alternatingly in series with approximately 90 km long optical fiber spans, and with a lightwave regenerator near the midpoint of the link. Traditionally, the design goal has been to minimize the number of telecommunications equipment facilities by maximizing the distance between equipment facilities, known as "facilities spacing". Each facility requires additional costs associated with splicing the fiber, costs of the facility real estate, and power costs of the facility. Maximizing facilities spacing minimizes the overall costs of the link. The optical line amplifiers deliver substantial output power to transmit the signals over the long distances of the resulting optical spans. The relatively high output power required can shorten amplifier life. High output power also increases power consumption by the transmission facility. Finally, high output power creates increased reflected power due to the non-linear properties of the optical fiber. Even if the amplifiers are operated at moderate power, the gain must still make up for the loss from the 90 km optical fiber span. A DCM must be included with each line amplifier to counteract the group delay effects of the 90 km long span of fiber. Despite all of these measures, a regenerator is still required to reform the signal at the middle of the link. It is commonly thought that to successfully transmit a signal over long optical links, in the range of 20–100 km and up, depending on the operating wavelength, the use of lightwave regenerators (LRE) is required.

In contrast, as already introduced and further described below in reference to FIG. 1, the preferred embodiment of the present invention implements the same 540 km optical fiber link using only low-power optical line amplifiers (LPLAs) placed as repeaters between 45 km long optical fiber spans. Although this more than doubles the number of amplifiers for a given link as compared to the traditional approach, the cost of the additional amplifiers is more than offset by the cost savings accrued from eliminating the use of the regenerator. This approach yields significant unexpected advantages, including reductions in costs and complexity of building and maintaining an optical fiber link.

The cost of increasing the number of LPLAs is offset by the savings from elimination of the regenerator site so long as a reasonable number of LPLAs are used. Savings accrue since the price of an LPLA is a fraction of the cost of a regenerator. The cost of LPLAs differs depending on how many wavelengths are supported by the LPLA. Also, the low operating power of the LPLA provides more options for powering the amplifier, which can also lead to cost savings.

Furthermore, the optical link of the present invention is less complex since it is transparent to the range of optical carriers and modulation schemes that it may transport. The present invention, by using shorter spans, promotes wavelength and bit rate transparency throughout the network, i.e. the same span can be used regardless of the wavelength and transmission bit rate. The advantage of this transparency is that it enables economical core design. Transparency makes it possible to easily upgrade the link into the foreseeable future, including the transmission technology of the network, without requiring a retrofit at other than the terminal sites. This transparency, also simplifies the task of deciding how to reroute traffic in the event of a failure elsewhere in the network. A spare link implemented using the present invention may be called upon to handle any of a variety of optical signals present in the network that may need restoring.

The invention increases the life span of the existing installed base of optical fiber hardware by requiring replacement of components only at the end points of the optical link.

The present invention also alleviates problems that arise in connection with high optical power levels. At high optical power densities, the glass core of an optical fiber exhibits a non-linear refractive index. This can lead to undesirable effects such as scattering and crosstalk among optical carriers. Because of such undesirable effects, arbitrarily large optical power levels can not be used to overcome attenuation. By using shorter spans and additional amplifiers for a given link, the present invention spreads amplification out over the link, requiring lower peak optical power levels. By requiring lower peak optical power levels, the non-linear behavior of the fiber can in turn be eliminated. By decreasing the non-linear behavior, a greater number of carriers can propagate along the fiber without interacting, and the bandwidth-distance product of the link is significantly increased.

In the present invention, shorter fiber spans and additional amplifiers for a given link are used, which spreads out amplification sites over the entire link. Spreading out amplification sites in turn better distributes integrated dispersion compensation. Since DCMs can be placed at any amplification site, the use of additional amplifiers distributes dispersion compensation more evenly over the link. By distributing dispersion compensation, smaller and less costly DCMs may also be used. By using smaller DCMs, overall fiber loss is decreased. With less accumulated dispersion to handle at each amplification stage, a different technology for dispersion compensation may be employed. Use of a short Bragg fiber grating dispersion compensation module may suffice instead of many kilometers of dispersion compensating fiber, since there is less accumulated dispersion.

This invention lowers the output power and gain on each amplifier. Lowering output power and gain reduces and/or eliminates gain tilt, spontaneous emission noise, and other undesirable effects. By lowering output power and gain on each amplifier, laser pump power is also reduced, leading to extended amplifier lifetime and improved reliability.

The present invention yields several additional benefits. Eliminating the LRE at an existing regenerator site frees space at the site since an optical amplifier requires less floor space than does a regenerator. By using shorter optical fiber spans, the invention requires lower power levels which facilitates dense wavelength division multiplexing (WDM) of signals. The present invention is wavelength scaleable and thus is more economical as wavelengths are added. By using shorter optical spans, the present invention also supports higher bit rate migration, e.g., 40 Gbps, 160 Gbps, or even greater.

Traditional Optical Links

Prior to the present invention, implementation of traditional long-haul optical links which were longer than the range of 20–100 km depending on the operating wavelength, required the use of lightwave regenerators (LREs). FIG. 2 depicts such a traditional optical link 202 having a length of 540 km. The traditional design approach has strived to space optical amplifiers further and further apart, to minimize overall network costs by maximizing the length of optical fiber spans. Traditional optical fiber link 202 includes a first line terminal equipment (LTE) site 204 and a second LTE site 206 terminating either end of the optical fiber link. Traditional optical fiber link 202 is implemented with four bi-directional optical line amplifiers (BDLAs) 242–248 connected to a series of optical fiber spans 228, including 90 km long optical fiber spans 230–240, and a lightwave regenerator (LRE) site 250 near the midpoint. Each optical fiber span 230–240 in traditional optical fiber links introduce in the range of 20–24 dB of loss. LRE site 250 includes a demodulator and a modulator.

First LTE site 204 includes two LTEs 208, 210 cross-coupled to a set of four wavelength division multiplexers (WDMs) 216. Second LTE site 206 includes two LTEs 212, 214, which are similarly cross-coupled to four WDMs 222.

Within first LTE site 204 and second LTE site 206, each WDM 216, 222 is directly connected to a respective transmission amplifier (TRA) 218, 224. Each TRA 218, 224 includes a dispersion compensation module (DCM) 220, 226, respectively, for reducing dispersion effects.

The output of each TRA 218, 224 is coupled by an optical fiber span 230, 240 to a BDLA optical amplifier 242, 248 respectively. Each BDLA 242–248 has a DCM 252–258 in turn, coupled to it. Optical fiber span 234 is coupled to a transmission amplifier (TRA) 260 of the demodulator of LRE site 250 which is in turn coupled to a wave division multiplexer (WDM) 262. Wave division multiplexer 262 is coupled to an optical to electrical receiver ("O/E") 264. Optical to electrical receiver ("O/E") 264 is a photo-diode or receiver. O/E 264 is coupled to a clock pulse recovery, retiming, and reshaping module ("3R") 266. 3R module 266 is in turn coupled to an electrical to optical retransmitter ("E/O") 268. E/O 268 is a laser diode or retransmitter. E/O 268 is coupled to WDM 270, which is in turn coupled to TRA 272, of the modulator of LRE site 250.

Either of LTE sites 204, 206 could alternatively be replaced by a modulator or demodulator, respectively, of another LRE 250 to achieve an even longer optical fiber link.

An Example Implementation of the Present Invention

FIG. 1 depicts a block diagram of an optical fiber link 102 in a preferred embodiment of the present invention. The present invention uses a greater number of optical amplifiers and shorter optical fiber spans to achieve an optical fiber link of equal length to the traditional optical link 202, e.g., 540 km. Unlike the traditional optical link design approach, the preferred embodiment of the present invention obviates the need for a mid-link LRE site.

In an exemplary embodiment of the invention, an optical fiber link 102 includes a first line terminal equipment (LTE) site 104 and a second LTE site 106 terminating either end of the optical fiber link. In a preferred embodiment, optical fiber link 102 is implemented with eleven (11) low power line amplifiers (LPLAs) 154–174 connected by a series of twelve (12) 45 km long optical fiber spans 130–152, collectively 128. LPLAs 154–174 as further described below in reference to FIG. 3, differ substantially from the BDLAs 242–248 used in traditional optical links. LPLAs for example use substantially less power per wavelength than BDLAs, but since they support more wavelengths, may not necessarily provide lower composite output power.

Each optical fiber span 130–152 can be, for example, a single mode fiber compliant with ITU-T G.652 and G.653. ITU-T, formally known as CCITT, is the telecommunications standardization sector of the International Telecommunications Union (ITU), an international standards body founded in 1948. The ITU-T publishes standards documents known as "recommendations" or "white papers" represented by a letter and a decimal number. Single mode fibers 130–152 are preferably compliant with ITU-T recommendations G.652 and G.653, for non-dispersion shifted (NDSF) and dispersion shifted fiber (DSF), respectively. The contents of ITU-T recommendations G.652 and G.653 are incorporated herein by reference in their entirety. Each span in traditional optical fiber links introduce at least 20–24 dB of loss. Each optical fiber span of the present invention by comparison introduces only 12–18 dB of loss. The present invention is especially well suited for use in the retrofitting of traditional fiber link installations. Thus optical fiber spans 130–152 used in implementing the present invention can be previously existing optical fiber spans.

First LTE site 104 includes two LTEs 108, 110, cross-coupled to a set of four wavelength division multiplexers (WDMs) 116. If the optical carrier signal to be produced is a SONET-compliant Optical Carrier OC-48 on the order of 2.5 GHz, LTEs 108, 110 may be a NORTEL S/DMS TransportNode OC-48. If the required optical carrier signal is on the order of 10 GHz, a NORTEL S/DMS Transport-Node OC-192 LTE may be used. An example WDM 116 is the wavelength division multiplexer manufactured by OPTICAL CORPORATION OF AMERICA (OCA). Second LTE site 106 also includes two LTEs 112, 114, which are similarly cross coupled to four wavelength division multiplexers (WDMs) 122. Within first LTE site 104 and second LTE site 106, each WDM 116, 122 is directly connected to a respective transmission amplifier (TRA) 118, 124. Each TRA 118, 124 has a dispersion compensation module (DCM) 120, 126, respectively, for reducing dispersion effects.

The output of each TRA 118, 124 is coupled by an optical fiber span 130, 152 to an optical amplifier, LPLA 154, 174. An exemplary LPLA is further described in reference to FIG. 3 below. LPLAs 154–174 can be constructed according to FIG. 3 from standard parts available from such companies as NORTEL, FUJITSU, ALCATEL, BOSCH and/or PIRELLI. TRAs 118, 124, can also be LPLA amplifiers. Examples of TRAs 118, 124 are low-power optical transmission amplifiers also manufactured by NORTEL, FUJITSU, ALCATEL, BOSCH and/or PIRELLI.

At every amplification stage, each LPLA 154–174 has a DCM 176–196 coupled to it. DCM 176–196 is for example a Bragg fiber grating dispersion compensation module or dispersion compensating fiber (DCF). The present invention uses less expensive, DCMs which create less signal loss, than the DCMs used in traditional optical links.

Thus, an optical link 102 of the present invention includes LTE sites 104, 106 connected by a series of twelve (12) optical fiber spans 130–152 collectively 128, and eleven (11) LPLAs 154–174. Either of LTE sites 104, 106 could alternatively be a modulator or demodulator portion, respectively, of a LRE site to achieve an even longer optical fiber link. Overall route length of optical fiber links of the present invention can be 300–2500 kilometers, or even greater. Such links can contain spans of lengths in the range of 30–60 km.

Figure 3:
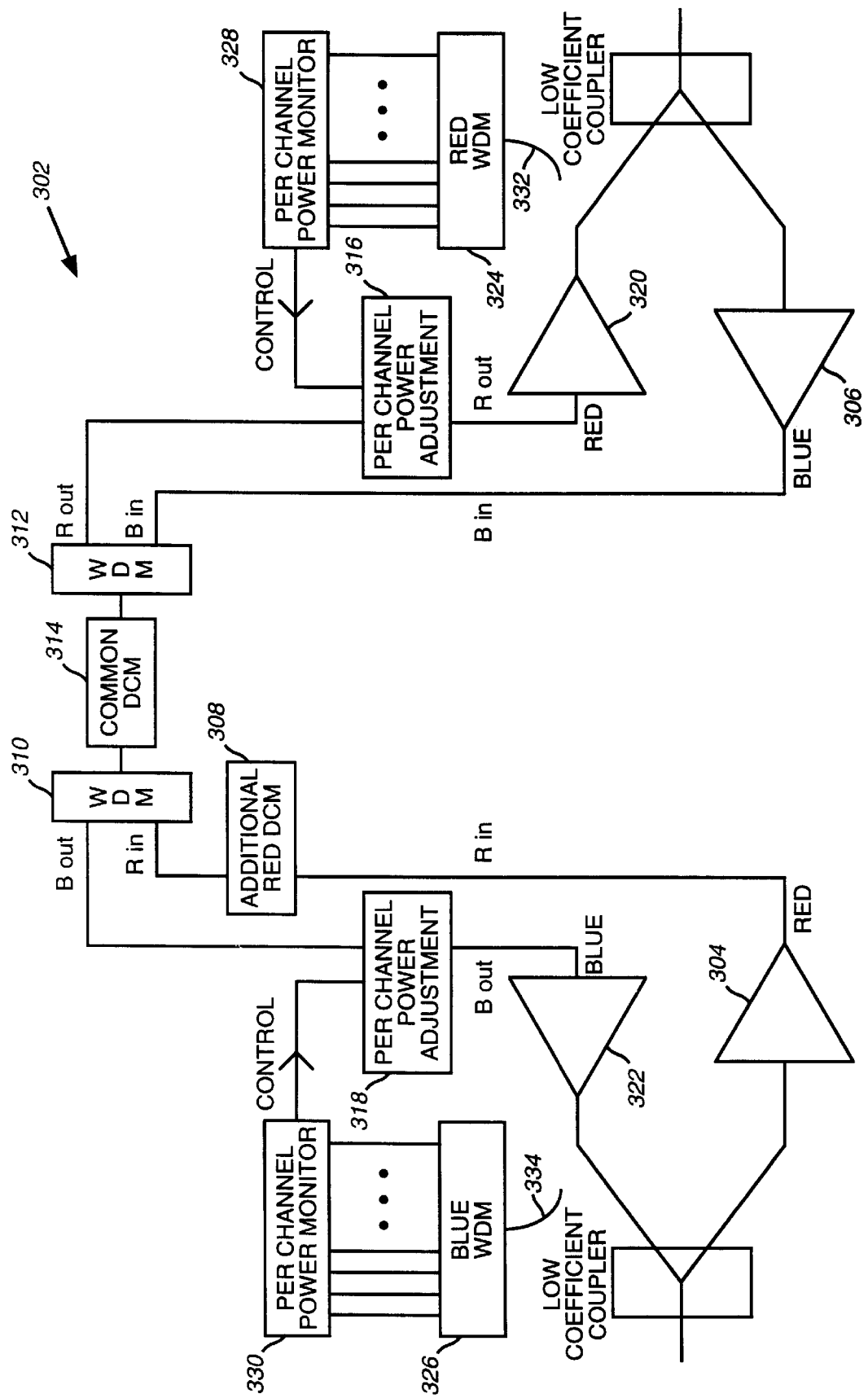
FIG. 3 is a block diagram depicting an exemplary LPLA.

FIG. 3 depicts an LPLA 302 of a preferred embodiment of the present invention. LPLA 302 is exemplary of LPLAs 154–174. LPLA 302 includes a blue amplifier 306. The output of blue amplifier 306, blue input signal "B-in" is coupled to a WDM 312. An output of WDM 312 is coupled to a common DCM 314 to compensate for the dispersion of the B-in signal. An output of common DCM 314 is coupled through a WDM 310 to create blue output signal "B-out". The B-out signal is coupled to a per channel power adjustment device (PCPA) 318 which can adjust the power of each input channel. The output of PCPA 318 is coupled to a blue amplifier 322. The output of blue amplifier 322 is coupled to a low coefficient coupler 334, also known as a "low tap", and to an output of LPLA 302. Low coefficient coupler 334 has a low coupling coefficient, e.g., 1%. Low coefficient coupler 334 "taps" off a signal from some of the power from the output of blue amplifier 322. Low coefficient coupler 334 is coupled to a blue WDM 326. Blue WDM 326 is coupled to a per channel power monitor (PCPM) 330. PCPM 330 monitors each channel of energy input and creates a control signal which is input into PCPA 318.

LPLA 302 also includes a red amplifier 304. The output of red amplifier 304, red input signal "R-in", can optionally be coupled through additional red DCM 308 to the WDM 310. Additional red DCM 308 is used if the slope of common DCM 314 does not match the non-dispersion shifted fiber (NDSF) slope. Additional red DCM 308 allows fine tuning and independent adjustment of the dispersion compensation in one direction. An output of WDM 310 is coupled to common DCM 314 to compensate for the dispersion of the R-in signal. An output of common DCM 314 is coupled through WDM 312 to create red output signal "R-out". The R-out signal is coupled to a per channel power adjustment device (PCPA) 316 which can adjust the power of each input channel. The output of PCPA 316 is coupled to a red amplifier 320. The output of red amplifier 320 is coupled to a low coefficient coupler 332 and to an output of LPLA 302. Low coefficient coupler 332 is coupled to a red WDM 324. Red WDM 324 is coupled to a per channel power monitor (PCPM) 328. PCPM 328 monitors each channel of energy input and creates a control signal which is input into PCPA 316.

Common DCM 314 compensates for all blue dispersion on red dispersion fiber. If communication is on blue dispersion fiber, then all colors are reversed in exemplary LPLA 302. Per channel adjustment 316, 318 and additional DCM 308, may only be needed on a periodic basis and not at every amplifier site. Power may be selectively adjusted by applying the control signal to per channel adjustment 316, 318. Per channel adjustment 316, 318 is a tunable filter.

The LPLA of the present invention differs in several important features from the BDLA amplifier of previous optical fiber networks. For example, LPLA amplifiers are spaced 35–50 km apart, whereas BDLA amplifiers are typically spaced 70–90 km apart. Gain of an LPLA amplifier is approximately 16 dB, while a BDLA amplifier's gain is typically 29 dB. An LPLA's noise figure is 6 dB, which is similar to that of a BDLA amp. Optical bandwidth of the LPLA amplifier is 30 nm, which is typical of the optical bandwidth of a BDLA amplifier. The center stage is accessible in the case of both a LPLA and a BDLA amplifier. LPLA pump wavelength can be 980 nm, 1480 nm, or both, which is comparable to a typical BDLA amplifier. LPLA amplifiers have active gain tilt control, whereas BDLA amplifiers typically do not. Both LPLA and typical BDLA amplifiers support bidirectional operation. It should be noted that the values mentioned are all typical values and specific amplifier values may vary.

The LPLA amplifier differs in several ways from the typical submarine amplifier. The spacing of LPLA amplifiers is in the range of 35–50 km, which is similar to typical spacing in the submarine/transoceanic environment. Gain of an LPLA amplifier is approximately 16 dB, which is similar to that of a submarine amp. An LPLA's noise figure is 6 dB, also similar to that of a submarine amp. Optical bandwidth of the LPLA amplifier is 30 nm, which compares to optical bandwidth of 3 nm of the submarine amp. The center stage is accessible in the case of an LPLA, but is not accessible in a submarine amplifier. LPLA pump wavelength can be 980 nm, 1480 nm, or both, whereas submarine amplifiers have a typical pump wavelength of 1480 nm. LPLA amplifiers have active gain tilt control, whereas submarine amplifiers do not. LPLAs can be operated bidirectionally, whereas typical submarine amplifiers cannot. It should be noted that the values mentioned are all typical values.

As is apparent from the comparisons of the preceeding two paragraphs, the LPLA is a hybrid between a submarine amplifier and today's BDLA. The LPLA has similar functionality with several enhancements over that of a BDLA with the spacing of a submarine amplifier.

In a preferred embodiment of the present invention, the optical communications link is a terrestrial/landline link (as opposed to a transoceanic or submarine link). Traditional terrestrial links are designed with a focus on minimal site costs, design engineers thus strive to use longer optical fiber spans. Accordingly, engineers designing a traditional terrestrial optical link would not use a 45 km span where a 90 km span is possible.

Terrestrial optical links often use mesh restoration switching which allows a digital signal to be switched from the working link over to any of several spare links. Mesh restoration switching requires wavelength and bitrate transparency. For a transparent link such as the present invention, the signals that pass over it, the number of wavelengths, the data rate (OC-48 at 2.5 Gbps or OC-192 at 10 Gbps), and the modulation format of each of the optical carriers, are all transparent to the link. Thus, the link accomodates any wavelength or combination of wavelengths in the erbium band, any combination of modulations of those wavelengths, any data rate, format, optical frequency and modulation. Link transparency permits simple rerouting, i.e., sudden switching of the link over which a digital signal is being carried. Transoceanic/submarine optical links differ from terrestrial ones in that rather than running several spare links, a single cable is traditionally used. Thus, link transparency is not as important in transoceanic links as it is in terrestrial.

The present invention's approach of using shorter optical fiber spans and an increased number of amplification sites runs counter to design conventions of terrestrial links. The conventional terrestrial link sought to maximize fiber span length in order to minimize overall link costs. Instead, the preferred embodiment of the invention uses shorter optical fiber spans coupled with LPLAs and DCMs to construct the terrestrial link.

In a preferred embodiment of the invention, the need for a lightwave regenerator (LRE) is obviated. The present invention, by avoiding the costs of a mid-link optical lightwave regenerator, yields substantial cost savings. Elimination of the regenerator makes the optical link transparent by eliminating the fixed data rate limitation inherent in present regenerators. A regenerator today is limited to providing either OC-48 or OC-192 data rates because of the clock recovery portion of the 3R module of the regenerator. Removal of the midlink regenerator makes the resulting link transparent to the data rate or wavelengths being carried over it.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical fiber communications network having an exceptionally long terrestrial fiber optic link comprising:
   a first LTE site terminating an end of said exceptionally long fiber optic link;
   a second LTE site terminating another end of said exceptionally long fiber optic link;
   a plurality of low-power optical line amplifiers (LPLAs) for amplifying the signal between said first LTE site and said second LTE site; and
   a plurality of optical fiber spans coupled alternatingly in series with said plurality of low-power optical line amplifiers (LPLAs).

2. The system according to claim 1, wherein said exceptionally long fiber optic link is greater than 500 km.

3. The system according to claim 1, wherein said exceptionally long fiber optic link is 300–2500 km or longer in overall route length depending upon the operating wavelength.

4. The system according to claim 3, wherein each of said plurality of optical fiber spans undergoes 12–18 dB of fiber loss.

5. The system according to claim 3, wherein each of said plurality of optical fiber spans is approximately 30–60 km in length.

6. The system according to claim 5, wherein said low-power optical line amplifiers (LPLAs) obviate the need for an optical lightwave regenerator (LRE).

7. The system according to claim 6, wherein said low-power optical line amplifiers (LPLAs) enable use of an equipment facility of smaller than conventional size.

8. The system according to claim 7, wherein said low-power optical line amplifiers (LPLAs) enable use of a lower level of power at an amplification site.

9. The system according to claim 6, wherein said optical link accomodates any wavelength, combination of wavelengths in the erbium band, and any combination of modulations applied to those wavelengths.

10. The system according to claim 6, wherein each of said plurality of low-power optical line amplifiers (LPLAs) has a dispersion compensation module (DCM) associated therewith.

11. The system according to claim 6, wherein one of said plurality of low-power optical line amplifiers (LPLAs) has a dispersion compensation module (DCM) associated therewith.

* * * * *